March 24, 1953 F. C. BIGGERT, JR 2,632,332
TOOL FEEDING DEVICE
Filed June 19, 1948 4 Sheets-Sheet 1

INVENTOR.
FLORENCE C. BIGGERT, JR.
BY J. E. Dickinson
atty.

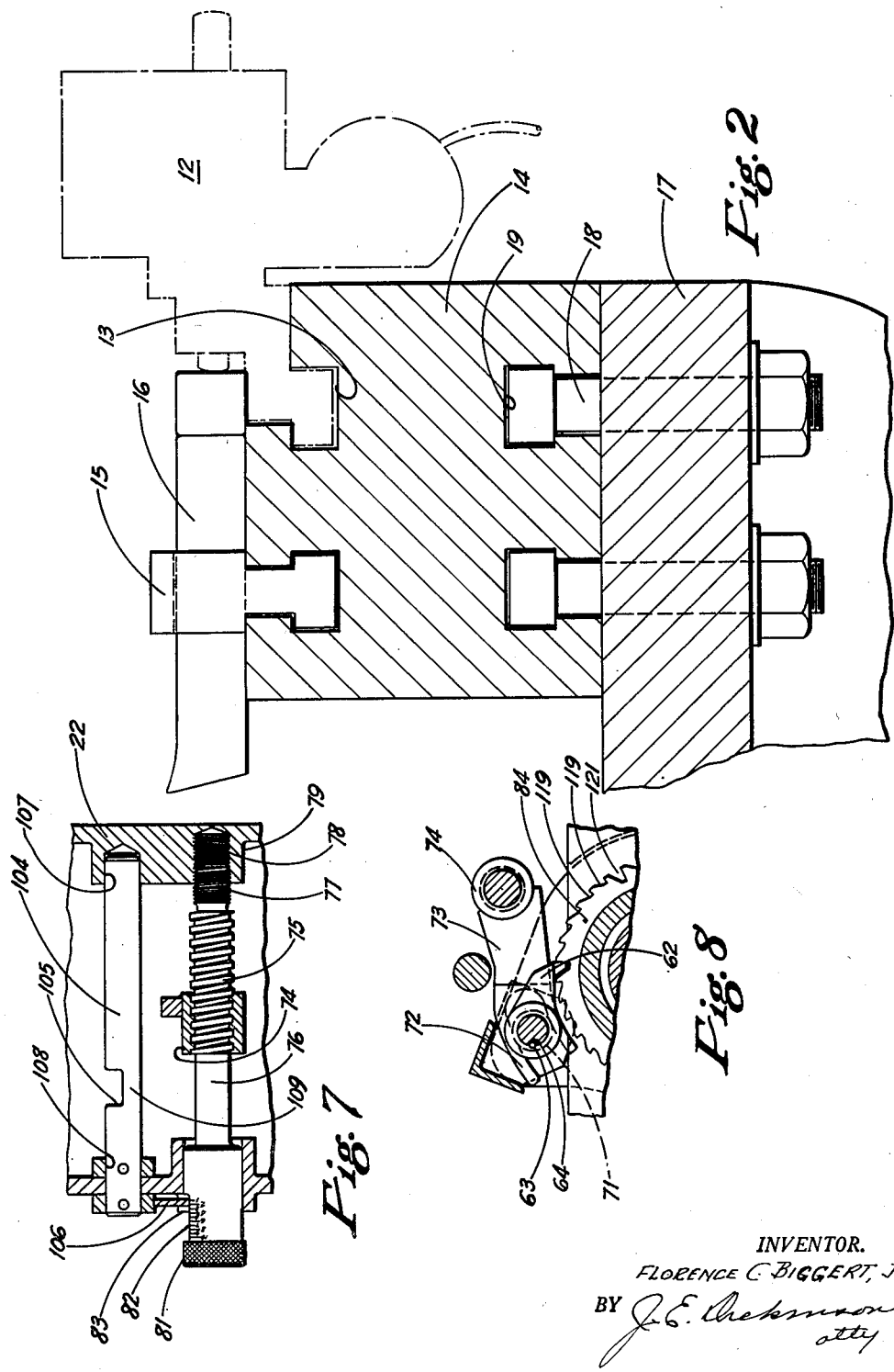

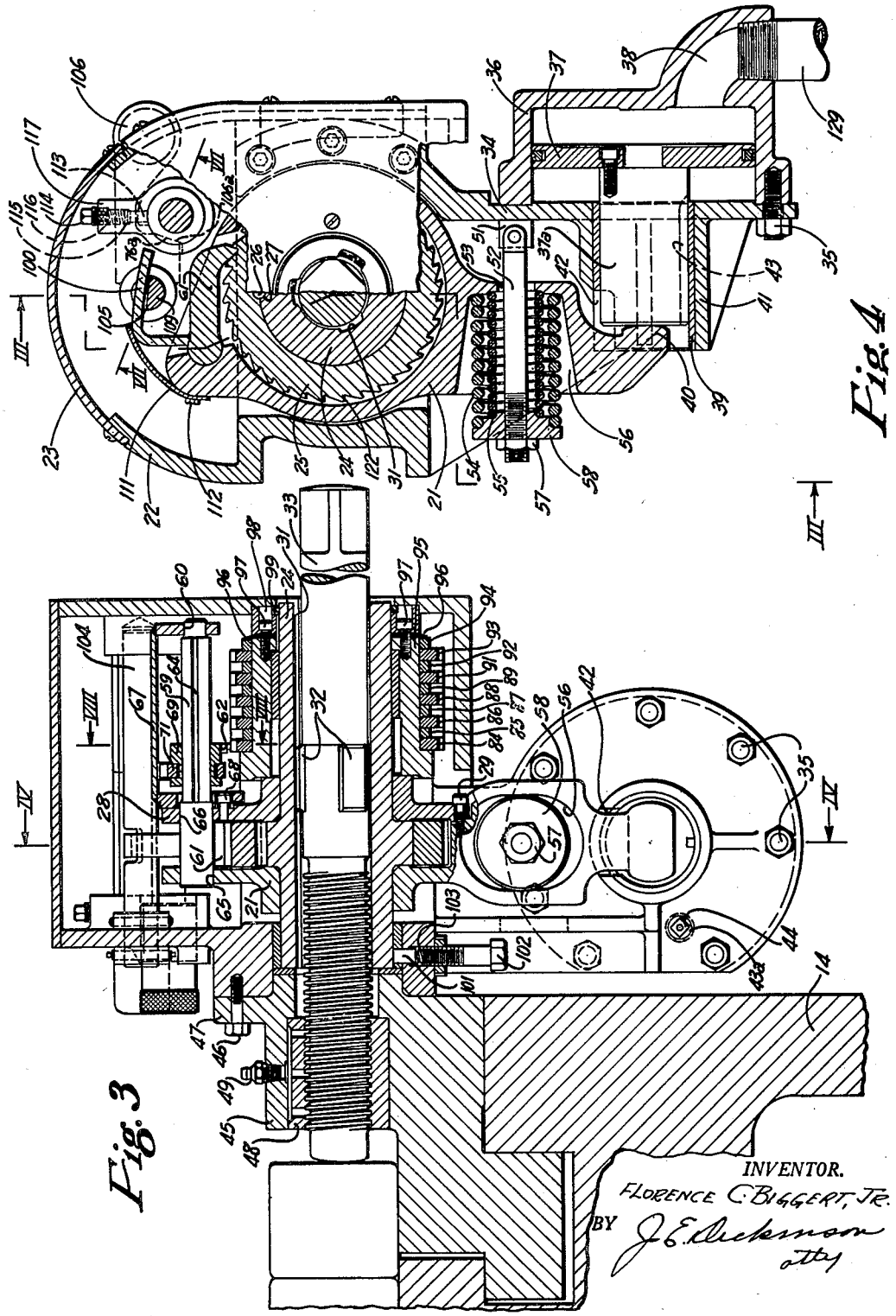

March 24, 1953  F. C. BIGGERT, JR  2,632,332
TOOL FEEDING DEVICE
Filed June 19, 1948  4 Sheets-Sheet 4
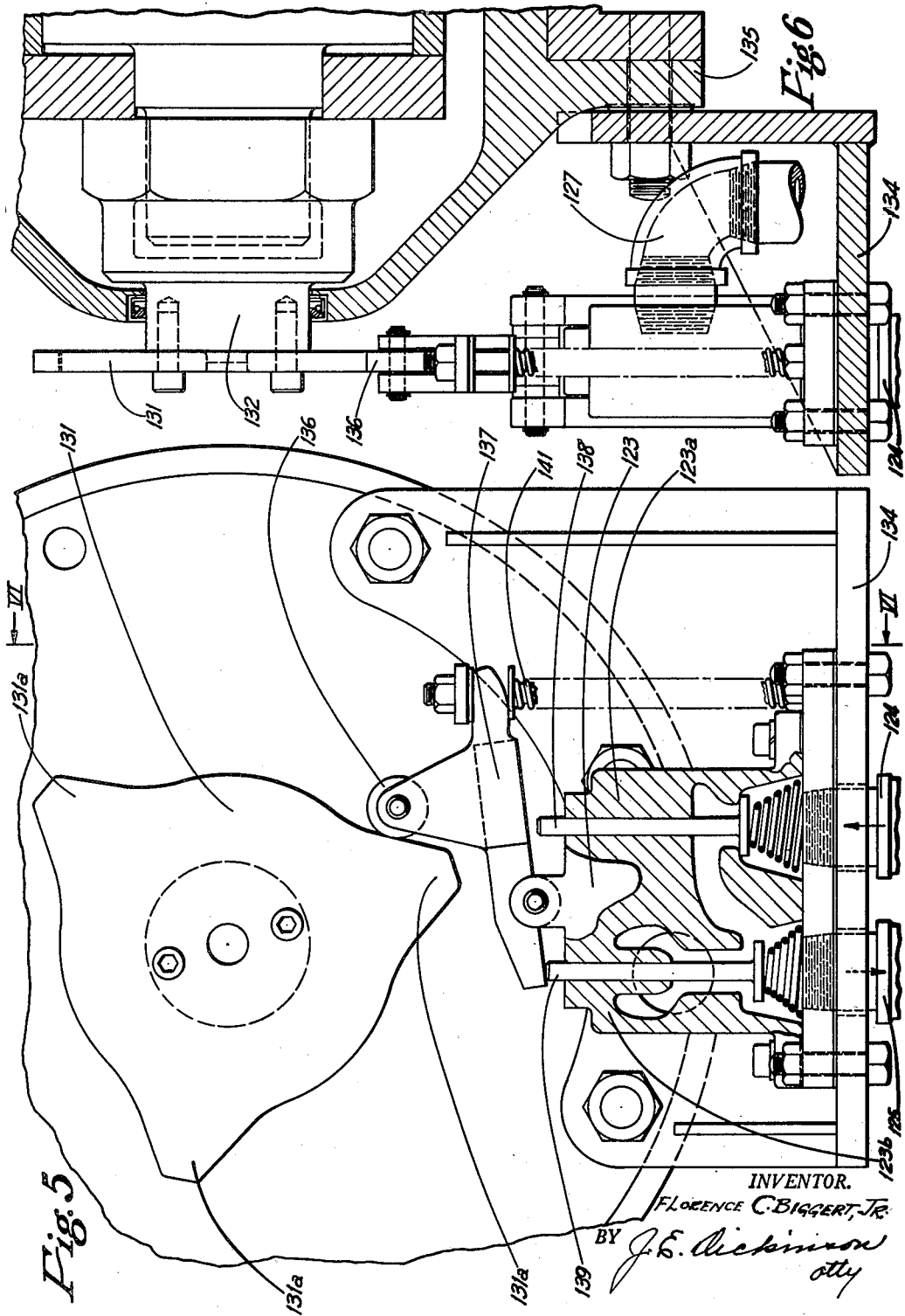
INVENTOR.
FLORENCE C. BIGGERT, JR.
BY J. E. Dickinson
atty Patented Mar. 24, 1953

2,632,332

UNITED STATES PATENT OFFICE 2,632,332

TOOL FEEDING DEVICE

Florence C. Biggert, Jr., Pittsburgh, Pa., assignor to United Engineering & Foundry Company, Pittsburgh, Pa., a corporation of Pennsylvania Application June 19, 1948, Serial No. 33,952

9 Claims. (Cl. 74—150)

This invention relates to a ratchet mechanism in which a pawl reciprocating at a constant frequency is so controlled as to cause it to advance its mating ratchet wheel at any one of several rates. While not necessarily so limited in its use, the invention relates more particularly to a ratchet mechanism to be used as a feeding means for cutting tools such as plunge cut tools used in turning rolls and similar cylindrical bodies.

In roll lathes of the usual type in which a tool is employed for making a plunge-cut in turning mill rolls and the like, the tool is slidably supported on a tool rest, and an adjusting screw adapted for manual operation is mounted axially of the tool for feeding the tool into the work piece. Such manual feeding is arduous work and because of fatigue of the operator is not satisfactory from a production standpoint. In addition it requires the constant attention of a highly skilled lathe operator, rendering it practically impossible for one operator to attend to more than one cutting tool in those cases where a series of plunge cuts are being made simultaneously.

With the tool feeding device herein disclosed, one operator can satisfactorily attend to a roll turning lathe upon which several plunge cut tools are operating without undue exertion or fatigue.

Among the objects of this invention are to provide an automatically operable adjusting apparatus for controlling the feed of a turning tool of a roll lathe or the like, to provide apparatus whereby a definite relationship may be maintained between the rotational speed of the work piece and the speed with which the turning tool is advanced into it, and to provide a compact turning-tool feeding apparatus which is simple of construction, light enough to be manually positioned, possessing a high degree of accuracy and a wide range of feed rates.

These objects, as well as the various other novel features and advantages of this invention, will be evident when the following description is read in conjunction with the accompanying drawings, wherein my invention is disclosed for use with a roll lathe, although it will be obvious to those skilled in the metal-cutting art that divers uses of the invention may be made.

Figure 2 is an enlarged partial sectional view taken on line II—II of Figure 1;

Figure 3 is a partial sectional view of one of the tool-feeding devices taken on line III—III of Figure 4;

Figure 4 is a sectional side elevation view taken on line IV—IV of Figure 3;

Figure 5 is an end elevation view of the hydraulic control valve and cam assembly taken on line V—V of Figure 1;

Figure 6 is a partial sectional side elevation view of the control assembly taken on line VI—VI of Figure 5;

Figure 7 is a sectional view taken on line VII—VII of Figure 4, and

Figure 8 is a sectional view taken on line VIII—VIII of Figure 3.

Figure 1:
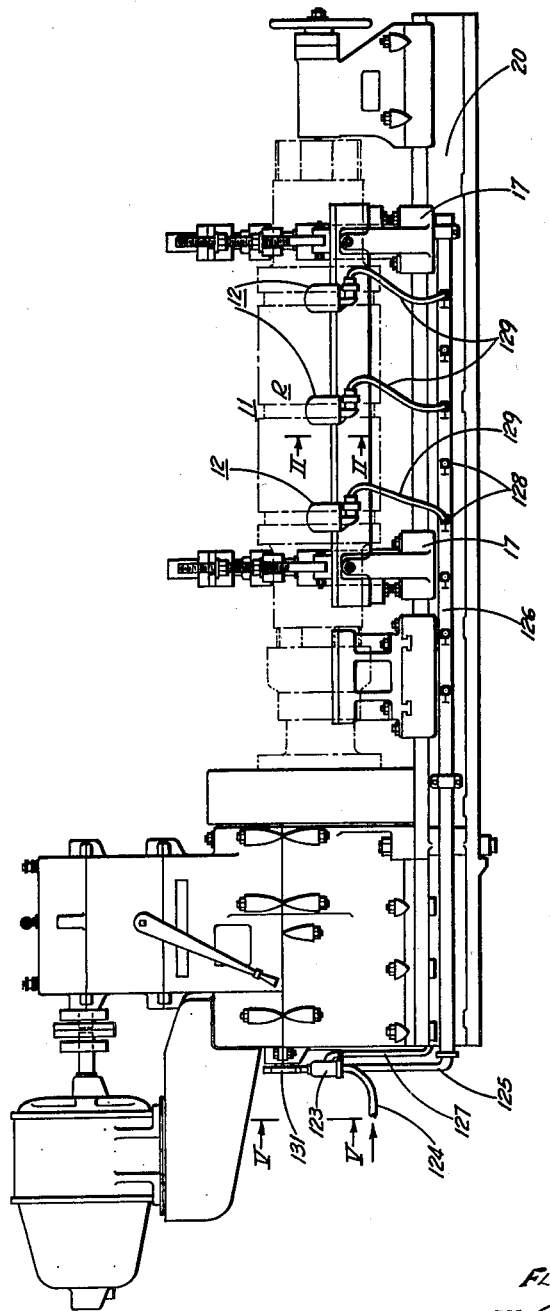
Figure 1 is a side elevation view of a roll lathe upon the tool rest of which, commonly called a piano rest, is mounted a plurality of turning-tool feeding devices embodying the features of the invention herein disclosed.

With reference to the drawings Figures 1 and 2, there is shown a roll R being machined in a motor driven lathe 11 upon which is provided a plurality of tool feeding devices 12 slidably mounted in a slot 13 of the lathe piano rest 14 having also yieldably secured thereto in tool holders 15 a plurality of cutting tools 16. The piano rest 14 is affixed to the housings 17 by bolts 18 received within longitudinally extending slots 19 provided at the base thereof and the housings attached to the lathe bed plate 20.

Included in the tool feeding apparatus 12 is a rocker arm 21, the upper portion of which is enclosed in a suitable housing 22 provided with a removable cover 23 thereon. The rocker arm 21 is mounted on a sleeve 24 having a driving ratchet 25 secured thereto by means of a key 26 received in keyway 27 and by a flange 28 passing around the sleeve 24 and attached to the rocker arm by bolts 29. Formed on the inner diameter of the sleeve 24 are several axially extending slots 31 within which are received a series of projections or splines 32 provided on the periphery of a turning tool adjusting screw 33. On the lower extension 34 of the housing 22 there is secured, by a series of studs 35, a cylinder body 36 within which a piston 37 is adapted to be actuated by a fluid, such as air, under pressure admitted to the cylinder chamber through a port 38. The piston rod 37a, attached to the piston 37, is reciprocated within a bushing 39 provided in the bored-out boss 41 at the lower portion of the housing 22. The boss 41 and the bushing 39 have a slotted opening 42 at the top to permit the rocker arm to be reciprocated therein.

Formed on the surface of the piston rod is an axially extending port 43 through which air may be exhausted to the atmosphere during the working stroke of the piston 37. The port 43 tapers toward the inner end thereof so that when the piston 37 is actuated and approaches the end of the working stroke, pressure is gradually increased as more air is entrapped between the piston 37 and the base of the cylinder to provide a cushioning effect. Extending through the housing portion 34 and into the chamber on the housing side of the piston 37 is an additional port or choke 43a, withing which is inserted a plug 44 through which is drilled a small hole which may be varied to adjust the degree of cushioning without the inconvenience of dismantling the apparatus to change the size of port 43. Integral with and at the lower portion of the rocker arm 21 is formed a pad 40 which makes contact with the end of the piston rod 37a. The housing 22 and the elements carried thereby are attached to a roll lathe back stop 45 by means of studs 46 which pass through a flange 47 at the upper portion of the back stop and into housing 22. The screw 33 engages with a stationary nut 48 secured within an opening thereof in the upper portion of the back stop 45. Lubricant is admitted to the screw threads through a grease fitting 49 mounted in the top of the back stop adjacent to the nut 48.

Also in the lower portion of the housing 22 and pivotally secured to a lug 51 welded thereto, there is a rod 52, which passes through an opening 53 in the rocker arm 21, encircled by two compression springs 54 and 55 received within a pocket 56 in the side of the rocker arm 21. The springs are retained in position on the rod 52 by a nut 57 and a washer 58. By opposing the movement of the rocker arm 21 when the arm is actuated by the piston 37, the springs 54 and 55 cause the moving parts to return to their inactive position when cylinder 37 is exhausted.

At the top of the rocker arm 21, a shaft 59 is rotatably mounted, having integral therewith and near one end thereof a driving pawl 61. Slidably mounted upon the same shaft is a control pawl 62 provided with a key 63 which is received within a keyway 64 formed axially along the shaft 59. The shaft 59 is supported at the driving pawl end in two bearings 65 and 66 provided in the rocker arm 21 and the flange 28 respectively and at the outboard end thereof within a bearing 60 mounted on an extension 67 secured to the flange 28 by studs 68. Engaging the control pawl hub 69, in a slot 71 around the periphery thereof, is the bifurcated portion 72 of a shifting unit 73 adapted to be shifted parallel to the shaft 59 for moving the control pawl to any desired position along the shaft 59. The threads of the nut 74 of the shifting unit 73 are engaged by the threads 75 of a shaft 76 upon the inner end of which are formed threads 77 engaging with the threads 78 provided in the boss 79 of the housing 22. Upon the outer end of the shaft 76 is formed a knurled adjusting knob 81 and along the exposed side thereof is inscribed a scale 82, each unit of which is adapted to come opposite the reference point 83 at the edge of the opening in the housing as the shaft is rotated through one complete revolution.

For purposes of illustration there is shown, in Figure 3, a plurality of control ratchets 84, 85, 86, 87, 88, 89, 91, 92 and 93 and a simulated ratchet or friction ring 94, all loosely mounted upon a cap 95 and pressed into frictional engagement with each other by means of two diametrically opposite spring plates 96 secured to the cap 95 by studs 97. In order to prevent the sleeve 24 from moving axially outward with respect to the housing 22, a thrust ring 98 having a sealing element 99 attached thereto is positioned between the cap 95 and the housing 22. A drag brake consisting of a pressure plug 101, pressed into engagement with the outer surface of sleeve 24 by means of a pressure adjusting screw 102 and compression spring 103, prevents the sleeve from being turned inadvertently.

The units of the indicating scale 82 are numbered, in the instant case, from 1 to 10, each of the numbers coinciding with a particular control ratchet of the series of ratchets shown in Figure 3. The threads 75 of the shaft 76 are so related in pitch to the threads 77 at the inner end thereof engaging with those of the boss 79 that, for each complete revolution of the shaft 76, the scale 82 thereon advances one unit with respect to the reference point 83 at the same time that the control pawl 62 is shifted to the next adjacent control ratchet.

To carry out the shifting operation, it is necessary to disengage the driving pawl 61 and the control pawl 62 from their respective driving and control ratchets. This is accomplished by means of a shaft 104, with a slot 105 cut transversely thereacross, having a lever 106 at one end thereof adapted to be turned approximately 180° counter-clockwise from the position shown in Figure 3. Within the slot 105 is received the outer end of a curved arm 100 attached to the driving pawl 61. Suitable bearings 107 and 108 are provided in the housing 22 for supporting the shaft 104. When the lever 106 is displaced counter-clockwise approximately 180° from the position shown in Figure 4, the remaining portion 109 of the shaft 104 will come into contact with the curved arm 100 attached to the driving pawl 61 and, by the cam action thereof, cause the shaft 59 to be rotated an amount sufficient to lift both the driving pawl 61 and the control pawl 62 out of engagement with the driving and control ratchets respectively. On the return of the lever 106 to the position as shown on Figure 4, the inclined cut away portion 106a thereof contacts with a flat surface 76a on the shaft 76 near the adjusting end thereof and, when in this position, prevents the shaft 76 from being rotated. A spring 111, secured to the rocker arm 21 by a stud 112, presses against the curved member 100 and, during normal operation of the apparatus, urges the control and driving pawls into engagement with their respective ratchets.

As the shaft 76 is rotated and for each complete revolution thereof, a spring pressed button 113, retained by a screw 114 and a spring 115 in an opening 116 of the boss 117, drops down into an axially extending shallow groove 118 cut along the shaft. Each time the button 113 drops into the groove 118, the increase in torque necessary to continue rotation indicates to the operator that the control pawl 62 is directly above and in position to be lowered into engagement with the particular control ratchet indicated on the scale 82.

Although all of the control ratchets have the same total number of teeth on the periphery thereof, each has a different number of deep teeth and the friction ring is equivalent to a control ratchet having all deep teeth. As shown in Figure 8, the control ratchet 84 possesses a group of five shallow teeth 119 for each deep cut tooth 121. The driving ratchet 25 possesses a plurality of teeth 122 which are all of the same depth and size. When the control pawl 62 engages with a deep tooth 121 of the control ratchet 84, then the driving pawl 61 will be permitted to move into engagement with one of the teeth 122 of the driving ratchet 25. However, when the control pawl 62 engages with a shallow tooth 119, then the shaft 59 is permitted to rotate through a smaller arc and the driving pawl 61 is withheld from engagement with the teeth of the driving ratchet 25.

The control system for actuating the piston 37 of each of the tool feeding devices 12 includes a three-way valve 123, which valve is shown diagrammatically and is of a well known commercial design adapted to be cam operated. As illustrated in the drawings, the valve 123 is connected by a pipe 124 to a compressed air source, not shown, by a pipe 125 to a header 126, extending along and secured to the bed of the lathe, and by a pipe 127 to the exhaust. There are a number of outlets each provided with a manually operated shut-off valve 128 spaced along the header 126 to which may be connected by means of flexible tubes 129 a plurality of tool feeding devices 12. Although in the drawings the valve actuating cam plate 131 is secured to the outer end of the roll lathe face plate pinion shaft 132, the cam could be attached to or otherwise controlled by one of the other shafts of the lathe so that any change in the rotational speed of the lathe automatically will change the rate at which the valve is actuated, thereby retaining the same number of valve actuations for each revolution of the work piece. The valve 123 is affixed to a bracket 134 secured to the end frame 135 of the lathe 11.

The preferred embodiment of my invention having been described in detail, operation thereof may be briefly summarized as follows:

Depending upon how rapidly the cutting tool is to be fed to a roll or the like rotatably positioned in the lathe, the control pawl 62 is adjusted to a pre-selected position from which it may be engaged with an appropriate control ratchet by first rotating the lever 106 approximately 180° counter-clockwise from the position shown in Figure 4, and then by rotating the shaft 76 until the scale 82 indicates that the pawl 62 is in the desired position. For purposes of illustration, this position will be assumed to be such that when the lever 106 is shifted back to the position shown in Figure 4, the control pawl 62 will be lowered into engagement with one of the teeth of the first control ratchet 84. The lowering of the control pawl 62 permits a limited rotation of the shaft 59 upon which both the control pawl 62 and the driving pawl 61 are supported. Since the control pawl, as shown in Figure 8, will be in engagement with one of the deep teeth 121 of the ratchet 84, the angle through which the shaft 59 is thus permitted to be turned allows the driving pawl 61 completely to engage with one of the teeth 122 of the driving ratchet 25.

By continuous rotation of the pinion shaft 132 to which the cam plate 131 is secured, the lobes 131a successively come into engagement with the cam follower 136 rocking the lever 137 whereby the valve stem 138 is depressed to open to the air supply the valve portion 123a and the valve stem 139 is released to rise and close to the exhaust the valve portion 123b. Air from the high pressure source enters and passes through the valve 123 to the cylinder 36, causing the piston 37 to move to the left of the position shown in Figure 3. As the pad 40 is in constant contact with the piston rod 37a, the arm 21 is thereby rocked in a clockwise direction. Since the driving pawl 61 and the control pawl 62 are mounted on a shaft supported by the arm 21, the rocking action of the arm 21 causes both the driving pawl 61 and the control pawl 62 to turn about the axis of the adjusting screw 33, which axis is coincident with the axis of rotation of the arm. Movement of the two pawls advances both the control ratchet 84 and the driving ratchet 25 respectively to the extent of one tooth, thereby causing the adjusting screw 33 to be turned and moved forward to feed the cutting tool 16 into engagement with the work piece. As soon as the cam follower 136 has passed over and beyond a cam lobe 131a, the spring 141 rocks the lever 137 in the opposite direction, to the position shown in Figure 5, permitting the valve stem 138 to rise, thus to close the valve portion 123a and causing the valve stem 139 to be depressed thereby to open the valve portion 123b to the exhaust. By the action of the two compression springs 54 and 55, the arm 21 is rocked in a counter-clockwise direction and brought back to its normal position as shown in Figure 4. The driving pawl 61 and the control pawl 62 are thereby returned to their initial positions. However, since the next succeeding control ratchet tooth 119 is shallow, the driving pawl 61 is prevented from engaging with the next succeeding tooth of the ratchet 25.

Further rotation of the cam plate 131 will cause the valve 123 to be actuated as before, but since the driving pawl 61 will not now be engaged with the driving ratchet 25, the driving pawl will pass over and permit the driving ratchet to remain stationary while the control ratchet alone is advanced. Until the control pawl 62 ultimately comes into contact with the next deep cut tooth 121, the driving pawl 61 merely will oscillate back and forth with the arm 21 without causing the ratchet 25 or the adjusting screw 33 to be advanced.

Each of the control ratchets contains a different number of deep and shallow cut teeth on the periphery thereof. Although the simulated ratchet or friction ring 94 possesses no teeth whatsoever but has an outside diameter equal to the diameter of a circle defined by the bottom portion of the deep-cut teeth on the various other control ratchets, hence the effect thereof is the same as if the ring 94 were provided with all deep-cut teeth around its periphery. When the control pawl 62 is shifted to make contact with the ring 94, the driving pawl 61 will always engage with one of the teeth of the driving ratchet 25 and cause the ratchet 25 together with the adjusting screw 33 and the cutting tool 16 to be advanced each time the arm 21 is oscillated.

When a turning operation has been completed or after the screw has been advanced the full length of the threads thereon, the two pawls are disengaged from their respective ratchets by means of the lever 106 and then, by applying a wrench to the end thereof, the screw can be backed out quickly to the starting position. To continue a particular cut, it is merely necessary to place additional metal blocks between the adjusting screw and the turning tool and again reengage the driving and control pawls with their respective ratchets.

In accordance with the provisions of the patent statutes, I have explained the principle and operation of my invention and have illustrated and described what I consider to represent the best embodiment thereof. However, I desire to have it understood that within the scope of the appended claims the invention may be practiced otherwise than as specifically illustrated and described.

I claim:

1. A ratchet mechanism comprising a screw, means for rotating and for advancing axially said screw, a driving ratchet mounted on said screw, a driving pawl adapted to be engaged with said ratchet, a plurality of control ratchets having varying numbers of shallow and deep cut teeth thereon, a control pawl adapted to be selectively positioned to engage the teeth of one of said last mentioned ratchets whereby said driving pawl will be permitted or prevented from engaging with the teeth of said driving ratchet, actuating means for said pawls, and means for oscillating said pawl actuating means in timed relationship thereby to actuate said pawls and said ratchets engaged therewith.

2. A ratchet mechanism comprising a screw, a ratchet mounted on and for advancing axially said screw, a driving pawl for rotating said ratchet, a plurality of control ratchets, a control pawl adapted to be selectively positioned to engage the teeth of one of said control ratchets whereby said driving pawl will be permitted to engage or prevented from engaging with the teeth of said driving ratchet, means for locking said control pawl in such pre-selected position, actuating means for said pawls, means for imparting periodic impulses to said pawl actuating means in timed relationship thereby to actuate said pawls and said ratchets engaged therewith, and means for disengaging said driving and control pawls from their respective ratchets.

3. A ratchet mechanism comprising a screw, a ratchet mounted on and for advancing axially said screw, a driving pawl for rotating said ratchet, a plurality of control ratchets, a control pawl adapted to be selectively positioned to engage the teeth of one of said control ratchets whereby said driving pawl will be permitted to engage or prevented from engaging with the teeth of said driving ratchet, means for locking said control pawl in such pre-selected position and means for imparting periodic impulses to said pawls in timed relationship thereby to actuate said ratchets engaged therewith.

4. A ratchet mechanism comprising a shaft, a ratchet mounted on and for advancing axially said shaft, a driving pawl for rotating said ratchet, a plurality of control ratchets, a control pawl adapted to be selectively positioned to engage the teeth of one of said control ratchets whereby said driving pawl will be permitted to engage or prevented from engaging with the teeth of said driving ratchet, means for locking said control pawl in such pre-selected position, means for imparting periodic impulses to said pawls in timed relationship thereby to actuate said ratchets engaged therewith, and means for disengaging said driving and control pawls from their respective ratchets.

5. In a ratchet mechanism, a driving ratchet wheel, a driving pawl arranged to engage the teeth of said wheel, a series of control ratchet wheels having different numbers of deep and shallow teeth, a control pawl adapted to be positioned for engagement with the teeth of one of said control ratchet wheels for advancing said control ratchet wheel one tooth at each oscillation of said pawls, a control pawl positioning means for selectively engaging said control pawl with one of said control ratchet wheels, said pawls being so related that said driving pawl engages with said ratchet wheel only when said control pawl engages with a deep tooth of the control ratchet wheel and control pawl locking means for preventing the shifting of said control from one control pawl ratchet wheel to another when both pawls are in their active positions and for preventing the return of said pawls to their active positions until said control pawl is aligned with one of said control ratchet wheels.

6. A ratchet mechanism comprising a splined threaded shaft, a driving ratchet slidably mounted thereon, a frame oscillatable about said shaft, a rock shaft mounted in said frame, a driving pawl secured to said rock shaft and normally urged toward engagement with the teeth of said ratchet, a control pawl slidably secured to said rock shaft, a plurality of freely rotatable control ratchets adjacent said rock shaft, adjustable means engaging said control pawl for positioning said pawl adjacent a pre-selected control ratchet to be engaged, means adapted to rotatably position said rock shaft whereby both pawls mounted thereon are disengaged from their ratchets, and means for imparting periodic oscillations to said frame.

7. A ratchet mechanism comprising a splined threaded shaft, a driving ratchet slidably mounted thereon, a frame oscillatable about said shaft, a rock shaft mounted in said frame, a driving pawl secured to said rock shaft and normally urged toward engagement with the teeth of said ratchet, a control pawl slidably secured to said rock shaft, a plurality of freely rotatable control ratchets adjacent said rock shaft having preselected numbers of deep and shallow teeth on the periphery thereof, means engaging said control pawl for positioning said pawl adjacent to a pre-selected control ratchet to be engaged, means adapted to rotatably position said rock shaft whereby both pawls mounted thereon are moved into or out of their ratchet engaging relationships, and means for imparting periodic oscillations to said frame.

8. A ratchet mechanism comprising a splined threaded shaft, a driving ratchet slidably mounted thereon, a frame oscillatable about said shaft, a rock shaft mounted in said frame, a driving pawl, having a projection extending therefrom, secured to said rock shaft and normally urged toward engagement with the teeth of said ratchet, a control pawl slidably secured to said rock shaft, a plurality of freely rotatable control ratchets, having different numbers of deep and shallow teeth on the peripheries thereof, adjacent said rock shaft, means engaging said control pawl for positioning said pawl adjacent a pre-selected control ratchet to be engaged, and means adapted to engage said projection whereby the rock shaft and the pawls mounted thereon may be placed into and out of their normal ratchet engaging positions.

9. A ratchet mechanism comprising a splined threaded shaft, a driving ratchet slidably mounted thereon, a frame oscillatable about said shaft, a rock shaft mounted in said frame, a driving pawl secured to said rock shaft and normally urged toward engagement with the teeth of said ratchet, a control pawl slidably secured to said rock shaft, a plurality of freely rotatable control ratchets adjacent said rock shaft, adjustable means engaging said control pawl for positioning said pawl adjacent a pre-selected control ratchet to be engaged, pre-selected control ratchet indicating means, means adapted to rotatably position said rock shaft whereby both pawls mounted thereon are disengaged from their ratchets, and means for imparting periodic oscillations to said frame.

FLORENCE C. BIGGERT, JR.

REFERENCES CITED

The following references are of record in the file of this patent:

UNITED STATES PATENTS

| Number | Name | Date |
|---|---|---|
| 325,260 | Maxwell | Sept. 1, 1885 |
| 1,466,467 | Burt | Aug. 28, 1923 |
| 1,568,641 | Thacher | Jan. 5, 1926 |
| 1,965,696 | Ferris | July 10, 1934 |
| 2,042,116 | Morris | May 26, 1936 |
| 2,435,046 | Martin | Jan. 27, 1948 |

FOREIGN PATENTS

| Number | Country | Date |
|---|---|---|
| 375,204 | Italy | Sept. 27, 1939 |